(12) United States Patent
Abdou-Sabet et al.

(10) Patent No.: US 6,579,944 B1
(45) Date of Patent: Jun. 17, 2003

(54) THERMOPLASTIC VULCANIZATE WITH DEFINED MORPHOLOGY FOR OPTIMUM ELASTIC RECOVERY

(75) Inventors: Sabet Abdou-Sabet, Akron, OH (US); Kenneth Emery Kear, Akron, OH (US); Mary C. Boyce, Wnchester, MA (US); Karla Drew Shaw, Copley, OH (US)

(73) Assignee: Advanced Elastomer Systems LP, Akron, OH (US)

( * ) Notice: Subject to any disclaimer, the term of this patent is extended or adjusted under 35 U.S.C. 154(b) by 0 days.

(21) Appl. No.: 10/069,083

(22) PCT Filed: Jul. 14, 2000

(86) PCT No.: PCT/US00/19300
§ 371 (c)(1),
(2), (4) Date: Jan. 15, 2002

(87) PCT Pub. No.: WO01/05876
PCT Pub. Date: Jan. 25, 2001

Related U.S. Application Data

(60) Provisional application No. 60/144,362, filed on Jul. 16, 1999.

(51) Int. Cl.$^7$ .................................................. C08J 3/00
(52) U.S. Cl. ..................... 525/191; 525/203; 525/207; 525/212; 525/232; 525/238; 525/240; 525/241
(58) Field of Search ................................ 525/191, 203, 525/207, 212, 232, 238, 240, 241

(56) References Cited

U.S. PATENT DOCUMENTS 4,808,665 A * 2/1989 Patel et al. ................. 525/133
6,207,752 B1 * 3/2001 Abraham et al. ............. 525/67

OTHER PUBLICATIONS

Kim et al, "Influence of Morphology on the Toughening Mechanisms of Polypropylene Modified with Core–Shell Particles Derived From Theroplastic Elastomers", Polymers for Advanced Technologies, vol. 9, pp. 709–715.*

Stricker et al, "Influence of Rubber Particle Size on Mechanical Properties of Polypropylene–SEBS Blends", Journal of Applied Polymer Science, vol. 68, pp. 1891–1901.*

* cited by examiner

*Primary Examiner*—Nathan M. Nutter
(74) *Attorney, Agent, or Firm*—Alfred D. Lobo; William A. Skinner

(57) ABSTRACT

A thermoplastic vulcanizate (TPV) is produced by melt blending until the volume fraction of dispersed rubber particles is greater than 0.5 preferably from 0.55 to 0.95, the remaining being the dispersed continuous plastic phase in a manner so as to develop a morphology which generates optimum elastic recovery. The majority (by volume) of large rubber particles are adjacent a small particle which is separated from one or more large particles by a critically thin, less than 0.1 $G(m)m$ thick, ligament of deformable plastic. When the majority of large particles evidence this morphology, as seen in a transmission electron microscope (TEM) photomicrograph, the TPV exhibits unexpectedly higher elastic recovery than if the ligaments were thicker. The foregoing is simulated in a micromechanical model which confirms, and in retrospect, predicts the observed actual elastic recovery of the TPV.

6 Claims, 8 Drawing Sheets

Case 1    FIG. 4A

Case 2    FIG. 4B

Case 3    FIG. 4C

Case 4    FIG. 4D

Case 5    FIG. 4E

Case 6    FIG. 4F

THERMOPLASTIC VULCANIZATE WITH DEFINED MORPHOLOGY FOR OPTIMUM ELASTIC RECOVERY

CROSS REFERENCE TO RELATED APPLICATION

This application is filed pursuant to Provisional Application No. 60/144,362 filed on July 16, 1999.

FIELD OF THE INVENTION

Polymer blends having a combination of elastic and thermoplastic properties, referred to as "thermoplastic vulcanizates" or "TPVs" (also referred to in the past as "thermoplastic elastomers" or "TPEs") are made by dynamic vulcanization to provide desired hardness/softness, oil and temperature resistance, oxidation resistance, and processability, inter alia. In thermoplastic elastomers which are elastomeric alloys and not physical blends, the properties depend on the relative amounts of "hard" and "soft" phases provided by each component, and the properties of each component. To be of commercial value, the hard phase is typically provided by a readily available engineering thermoplastic resin, familiarly referred to as a "plastic" for brevity. Most commonly the plastic is chosen from polyesters, polyamides and polyolefins which provide a continuous phase of the hard phase in which dispersed domains of the "soft" phase of an elastomer are present. Optimizing the elastic recovery of a TPV and confirming the physical nature of its defined morphology, is the subject of this, invention. Confirmation is obtained with both photomicrographs and computer modelling. The photomicrographs are from an electron microscope, preferably a transmission electron microscope (TEM) Of particular interest are relatively "soft" blends of a vulcanizable (hereafter "curable" for brevity) rubber having controlled hardness less than about 90 Shore A. Such blends are exceptionally resistant to oil swelling, and to compression set. The term "elastomer" is used herein to refer to a vulcanized blend of polyolefin and rubber which may be formulated to exhibit varying degrees of elasticity such that a test strip 2.5 cm wide and 25 mm thick may be stretched in the range from about 5% to 100% of its initial length and still return to it; further, such vulcanized elastomer is necessarily thermoplastic and re-processable.

The Problem

There is a market need for blends of polar engineering thermoplastics containing a dispersed "polar rubber" phase and a continuous "plastic" phase, which blends have high elastic recovery. The term "elastic recovery" refers to the proportion of recovery after deformation and is quantified as percent recovery after compression. A TPV having a volume fraction of rubber particles greater than about 0.7 may have an elastic recovery in the range from about 50% to 60% at 50% compression; to get a higher elastic recovery one may modify the composition of the particular rubber dispersed in the continuous plastic phase, the ratio of the dispersed and continuous phases, the amounts and composition of the curing agent(s) used, the amount of processing oil, and other ingredients, and other factors, with the expectation that, with enough trial and error, one can make a TPV with an elastic recovery in the range from about 60% to 65%. How these factors influence the morphology of a TPV has been the subject of much study. Very little of this study has been devoted to identifying the key morphological requirement in a TPV which is most likely to provide much higher elastic recovery than one would normally expect of the same TPV produced according to prior art procedures not specifically directed to the formation of the critical morphology.

BACKGROUND OF THE INVENTION

Elastic recovery is that fraction of a given deformation that behaves elastically; a perfectly elastic material has a recovery of 100% while a perfectly plastic recovery has no elastic recovery. (see *Whittington's Dictionary of Plastics* 3rd Ed. 1993 Technomic Publishing). Elastic recovery is an important property of a TPV which is expected to behave like a natural rubber for examples in application where a TPV is used in dynamic applications such as in hoses, and in sealing applications.

To date, a TPV is formulated with specified components including in addition to the rubber and plastic, plasticizers, processing aids and fillers, by melt-blending the ingredients within generally defined processing parameters, until by trial and error, a usable TPV is made. A "usable TPV" is one which can be used in a marketable product. In particular, how the components are confined in a mixing and melt-blending means, the rate at which mixing energy is inculcated, the time over which the components are melt-blended, and the conditions under which the TPV is cooled are derived from experience and by trial and error. Though it is likely, with all the work directed to the production of TPVs over the past decade, that TPVs having optimum morphology may have been produced; but if they have been, the morphology produced was accidentally produced. An improvement in elastic recovery was generally sought by varying the curing agent for the rubber, and also the processing oil, processing aid, and filler. No one has recognized, much less identified, the critical morphological feature directly responsible for producing elastic recovery substantially greater than that which is obtained if the critical feature is lacking in a usable TPV.

A usable TPV, contains particles of rubber the majority of which, that is greater than 50% by volume, are in the size range less than about 5 $\mu$m, some being as large as 10 $\mu$m and others being as small as 0.1 $\mu$m or smaller. Particles smaller than 0.1 $\mu$m are believed to be portions fractured from larger particles while the TPV is being melt-blended, and this very small size serves to define them as "very small" particles. A TPV preferred for its superior physical properties and acceptable elastic recovery has relatively large domains of rubber the majority of which are in the size range from about 1–5 $\mu$m, preferably 1–3 $\mu$m, and this size range serves to define them as "large particles". The shape of all particles resembles that of a distorted ellipsoid or elongated ovoid, and this shape is particularly evident in large particles. The remaining rubber particles, in the size range larger than a "very small" particle and smaller than the mean diameter of the "large particles", are defined as "small particles" or "mid-range particles" which also are generally ellipsoidal in shape. Because of the shape, the "diameter" referred to is the effective diameter, that is, the diameter the particle would have had if it was spherical. The elongated ovoid shape of the particles allows a high packing fraction of rubber particles in a unit volume of TPV, this being a characteristic of a usable TPV. The number of very small particles is of minor consequence in a TPV; the number of small and large particles is not. To date, there has been no clear teaching as to what effect the size of the particles and their distribution has in a TPV particularly with respect to its elastic recovery.

The morphology of various TPVs has been characterized in an article titled *Morphology of Elastomeric Alloys* by Sabet Abdou-Sabet and Raman P. Patel (Rubber Chem. & Tech., Vol 64, No. 5,pg 769–779, Nov.–Dec. 1991). Several variables affecting the morphology are identified, including the molecular weight of EPDM and PP; the ratio of EPDM to PP; degree of crosslinking; and types of crosslinks; but the effect of the thickness of a ligament, or the volume of continuous plastic phase between adjacent particles was not appreciated. The term "ligament" as used herein refers to the material of the continuous plastic phase connecting two adjacently disposed particles, and the "thickness of a ligament" refers to the minimum narrowed distance between two adjacent particles.

The origin of the overall elastomeric-like stress-strain behavior of a TPV including a large percentage of recoverable strain upon unloading is addressed in publications by Kikuchi et al (1992), Kawabata et al (1992) and Soliman et al (1999). In an article titled Origin of Rubber Elasticity in Thermoplastic Elastomers Consisting of Crosslnked Rubber Particles and Ductile Matrix, by Y. Kikuchi, T. Fukui, T. Okada and T. Inoue (Jour. of Appl. Polym. Sci. 50, 261–271 (1992), the strain recovery of a TPE is analyzed using a two-dimensional model for a two-phase system by finite element analysis (FEA). They concluded that at highly deformed states at which almost the whole matrix has yielded to stress concentration, the ligament matrix between rubber inclusions in the stretching direction is locally preserved within an elastic limit and acts as an in situ formed adhesive for connecting the rubber particles. They failed to appreciate that the thickness of the ligament was critically significant and that ligaments are deformed above the elastic limit, rather than preserved below it.

In an article titled Deformation Mechanism and Microstructure of Thermoplastic Elastomer Estimated On the Basis Of Its Mechanical Behavior under Finite Deformation, Sueo Kawabata, S. Kitawaki, et al. (Jour. of Appl. Polym. Sci. 50, 245–259 (1992), presented a model to describe the large deformation mechanism of EPDM/PP and found that oil domains or layers between blocks play an important role in separating the rubber blocks from each other, allowing them to become free elements without friction between them. But Kawabata et al also failed to recognize the critical function of thin ligaments, less than 0.1 $\mu$m thick, between adjacent rubber particles, particularly large and small rubber particles.

For simplicity the description relating to the critical thickness of plural ligaments between a small particle and adjacent large particles, or, between large particles themselves, does not take into consideration components other than the rubber particles and the continuous plastic phase in which they are dispersed. One skilled in the art will recognize that such other components are typically dispersed between both phases, the relative amounts in each phase being determined by the particular composition of each phase and that of the other component. The presence of such other components does not noticeably affect the criticality of the thickness of ligaments with respect to their effect on elastic recovery.

SUMMARY OF THE INVENTION

It has been discovered that thin ligaments (as defined herein) connecting adjacent particles, and particularly "small" and "large" particles of rubber, is the critical determining factor which provides substantially higher elastic recovery than obtained with ligaments thicker than 0.1 $\mu$m; the mechanism of deformation and of elastic recovery related to the microstructure and mechanical behavior of a TPV is simulated and confirmed by a micromechanical model of a representative volume element (RVE) in which key structural features, particularly ligament thickness and asymmetry, are systematically varied; tensile properties are not significantly affected by a wide range of ligament thickness; in retrospect, having found what the critical requirement is, parameters for rubber particles of any composition, and for any plastic phase, may be used in the model to predict the elastic recovery of the TPV.

It is therefore a general object of this invention to provide a thermoplastic vulcanizate of an elastomer and a plastic comprising particles of elastomer dispersed in a continuous phase of plastic, such that a majority of particles, and particularly a majority of large particles which are present in a major proportion by volume relative to the small particles, are adjacent at least one small particle critically spaced apart by ligaments, and at least 15% of the ligaments have a thickness less than 10% of the mean diameter of large particles, preferably less than 5% of the "mean large particle diameter", and the remaining ligaments have a thickness less than 50%, preferably from 15% to about 30% of the mean large particle diameter. Preferably the mean large particle diameter is in the range from 1 $\mu$m to 3 $\mu$m, most preferably about 1 $\mu$m; and, the small particle diameter is in the range from 1% to 60% of the mean large particle diameter, preferably from 10% to 40%. Having confirmed the essential requirement for optimum, or near-optimum elastic recovery for a specific TPV-R with a micromechanical model, it now permits one to predict what conditions will generate the thin ligaments in any TPV with any other volume fraction and particle characteristics.

It is a specific object of this invention to provide a TPV having a major proportion by volume of rubber relative to plastic (volume fraction>05) with a morphology in which the distribution of small and large particles is such that a small particle is proximately disposed relative to at least 3 large particles; preferably the number of large particles is numerically smaller than the number of small and very small particles combined.

It is another specific object of this invention to modify a finite element analysis machine program to model a "five-particle" RVE ("5P-RVE") which is uniquely adapted to mimic the mechanical behavior of small and large rubber particles dispersed in a continuous plastic phase.

BRIEF DESCRIPTION OF THE DRAWING

The foregoing and additional objects and advantages of the invention will best be understood by reference to the following detailed description, accompanied with schematic illustrations of the prior art and a preferred embodiment of the invention, in which illustrations.

DETAILED DESCRIPTION OF PREFERRED EMBODIMENTS

Figure 1:
FIG. 1 is a TEM photomicrograph of a TPV in which the dispersed rubber particles have a volume fraction of 0.77 at a magnification of 18,000 X

Preferred TPVs which benefit greatly from having high elastic recovery in the range above 65%, preferably from about 70% to 95%, contain from about 55% to 95% volume fraction of rubber and have a hardness in the range from about Shore A 30 to Shore A 90. A major proportion of all the large particles in a preferred representative TPV, referred to as "TPV-R", have a diameter in the range from about 1–3 μm The TEM photomicrograph identified as FIG. 1 shows the morphology of the TPV-R prepared in the illustrative example below. A sample of the TPV-R is microtomed and the surface stained with ruthenium tetroxide. The TEM image is obtained with an efficient backscattered electron detector which allows good differentiation between the phases and shows many distorted ellipsoidal EPDM particles in the 1–3 μm size range separated by regions of the continuous PP phase.

It is evident that the thickness of ligaments is relatively small compared to the diameter of even a small particle, and that there are much thicker regions of plastic matrix.

The TPV-R is prepared with a volume fraction $V_f$=0.77 of EPDM-rubber the remaining 0.23 being plastic matrix; this ratio is provided by about 62.5 parts EPDM rubber and 37.5 parts PP, "parts" referring to parts by weight, ignoring other ingredients. Though EPDM may be made to include a wide range of olefin and non-conjugated diene comonomers, the EPDM used is a copolymer of ethylene, propylene and ethylidenenorbornene. The thermoplastic polyolefin is general purpose polypropylene (PP), sp. gr. 0.902, which is melt-blended with the rubber along with other ingredients specified in TPV #3 in Table X of U.S. Pat. No. 4,311,628 to Abdou-Sabet and Fath. The numbers following identification of an ingredient refer to the parts by weight in the blend:

EPDM rubber 62.5; PP 37.5; Kaolin clay 23.1; Paraffinic extender oil 78.13; magnesium oxide 0.13; titanium dioxide 3.23; zinc oxide 1.25; 2,5-di(tert-amyl)hydroquinone 0.94; octylphenol/formaldehyde curing resin (Arofene 9273) 5.63. The ingredients are preferably melt-blended in an extruder with a barrel temperature maintained in the range from about 160° C. to about 200° C., samples being taken from material processed with a residence time ranging from about 2 min to 4 min, at a temperature ranging from about 170° C. to 180° C. The samples which had a hardness of about 73 Shore A, were tested for tensile and elastic recovery and also prepared for TEM photomicrographs. The melt-blended TPV has the following physical properties:

| Hardness | 72 Shore A |
| --- | --- |
| 100% modulus, Kg/cm$^2$ | 34.5 |
| Ultimate Tens. Strength, Kg/cm$^2$ | 86.5 |
| Ultimate elongation, % | 370 |
| Tension set, % | 11 |
| Compression set, % | 17 |
| ASTM #3 oil swell, % | 87 |

In the TPV-R made with the above ingredients the volume fraction of rubber particles is 0.77. Though there is a substantial amount of clay, it is believed that most of the clay is in the rubber particles, and the remainder, being inert in the plastic phase, does not affect the properties of the PP so significantly as to affect the procedure used in the micromechanical model.

The process for producing a TPV with substantially maximized elastic recovery comprises melt-blending ingredients of the TPV at appropriate processing conditions for sufficient time while providing enough energy at a rate sufficient to produce a matrix of plastic in which substantially all the large particles are adjacently disposed relative to at least one small particle which is adjacent to at least 3 large particles, the small particle and the large particles being in near-contiguous relationship such that the small particle is spaced apart from at least one large particle by at least two ligaments having a thickness less than 5% of the mean diameter of large particles in the matrix, and the remaining ligaments are in the range from more than 10% to about 50% of the mean large particle diameter. As will readily be evident, whether the TPV meets the critical criterion will be determined by examination of a TEM photomicrograph. Upon making the determination that the criterion has been met, the melt-blending means is repetitively operated to produce an arbitrarily large amount of TPV which has optimal elastic recovery.

The TEM photomicrograph, FIG. 1, is representative of a sample with about 25% of the ligaments being critically thin; this sample showed the highest elastic recovery, about 50% from 25% compression; and about 70% recovery from 50% compression. As will be evident from the Table 2 presented below, these results are confirmed by FEA using a unique and novel modification of commercially available Abaqus software as described in greater detail below.

The elastomer phase was modeled using a three-dimensional RVE based on a 5-particle model, and elastic properties measured for an EPDM rubber used in commercial Santoprene 73A rubber. The matrix phase was modeled using elastic viscoplastic properties measured for PP with 20% by weight oil. The rubber particles were assumed to be round and distributed in a hexagonal close packing array. Five particles are modeled to simulate the entire array using a plane strain finite element model in which the material being compressed is restrained between parallel planes, and the volume fraction of rubber is the same in each. It is assumed that there is no relative movement or "slip" at the boundary between a rubber particle and the continuous PP phase because they are cohesively bonded, that is, one phase cannot be separated from the other without tearing it out.

Figure 2:
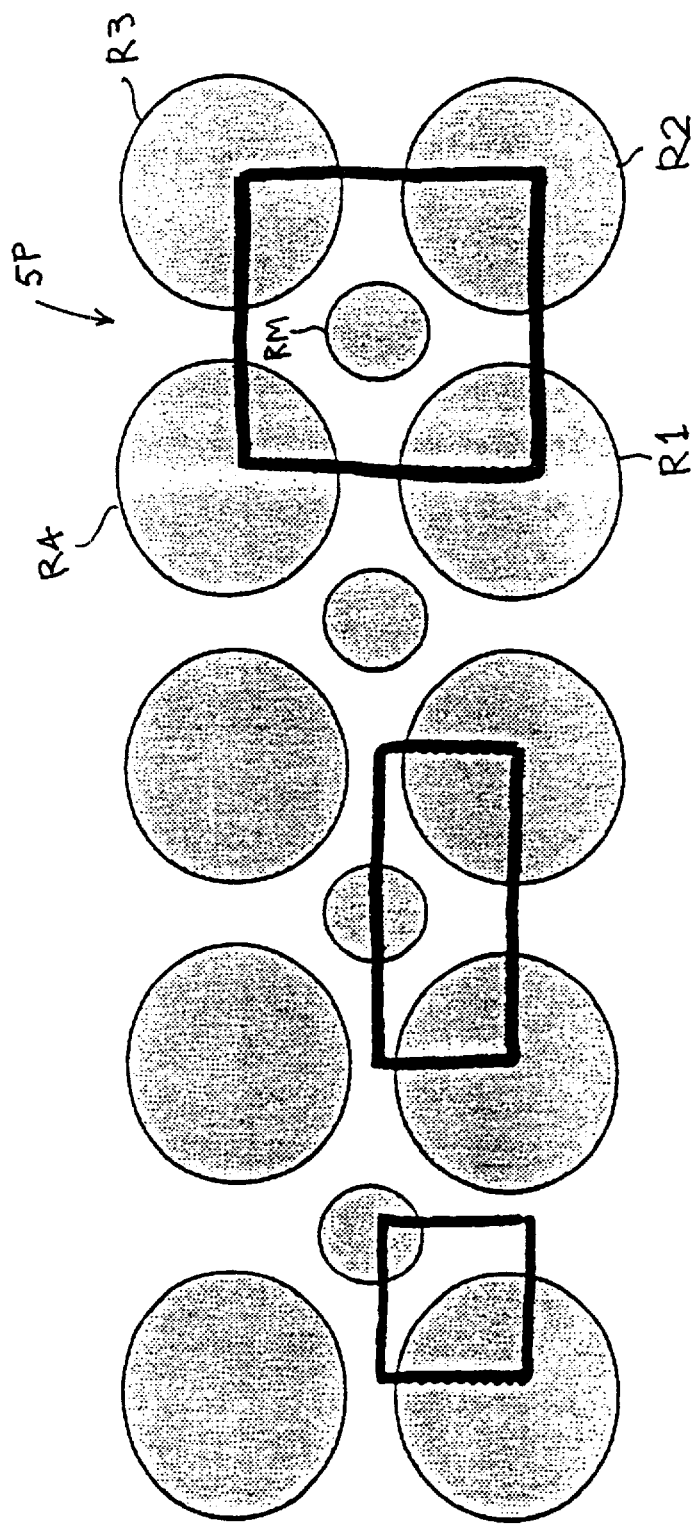
FIG. 2 is a schematic illustration of a simplified idealized finite element analysis (FEA) model of four large particles adjacent a small particle.

Referring to FIG. 2 there is shown a closely packed array of a 5-particle model the small particle in the middle surrounded by 4 large particles. In such an array there are 8 ligaments; a 4-particle array with a small particle surrounded by 3 large particles will have 6 ligaments. The distribution of very small particles is ignored as their effect is believed to be insubstantial and there is no definitive data to indicate otherwise.

The modelling of five particles in a matrix uniquely captures the interaction of the particles with one another as well as the interaction with the matrix. Some stages of deformation behavior are found to be matrix-dependent and other stages were particle-dependent. The 5-particle model predicts both the loading and the unloading behavior which was closely comparable to experimental results. The micromechanical model revealed that the ligaments of PP plastically deform early on in the deformation and are the controlling factors in the initial stiffness and "flow stress" of the system. The bulkier regions of PP are plastically essentially non-deformable; but deformation of thin ligaments provides the elastomer-like behavior of the TPV. During unloading, the rubber undergoes recovery while thin ligaments rotate and buckle to accommodate the recovery.

In the 5-particle model referred to generally by reference numeral 5P, a center small particle RM is nested between four large particles R1, R2, R3 and R4 in the TPV-R. The plane strain nature of the model means that the particles are modelled as cylinders and the strain along the axis of the cylinder (i.e. into the paper) is restricted to be zero. Also note that symmetry boundary conditions are applied to all edges of the model such that vertical lines experience uniform horizontal displacement and horizontal lines experience uniform vertical displacement. Because of the plane strain behavior of the model simulated stress-strain curves are compared to experimental plane strain stress vs strain curves (as opposed to uniaxial stress vs. strain curves).

Figure 3:
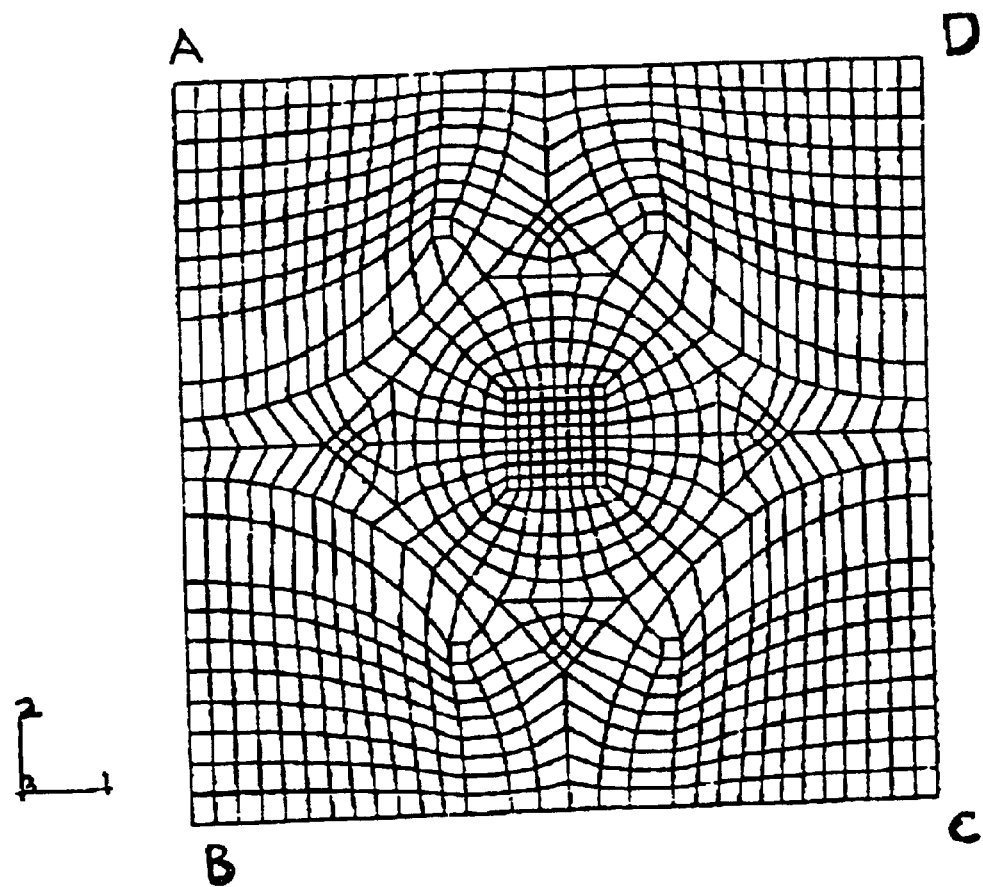
FIG. 3 is an example mesh 5-particle model of a representative TPV ("TPV-R") having a Shore A 73 hardness.

FIG. 3 depicts a typical finite element mesh for the five-particle RVE (5P-RVE) for the TPV-R. The 5P-RVE micromechanical model consists of a center small particle nested between four larger particles. Note that the two-dimensional plane strain nature of the model means that the "particles" are cylinders where the cylinder axes are co-axial with the constraint direction. The TPV-R particle volume fraction is 0.77 and the particle area fraction (in the 1-2 plane) of the model is approximated to be the volume fraction of particles (a reasonable approximation given the large volume fraction of particles and the thin ligaments of matrix bridging the particles). Symmetry conditions are imposed on all RVE boundaries such that initially vertical boundaries remain vertical $u_{1|AB}=0$ and $u_{1|CD}=u_{1|C}$; and initially horizontal boundaries remain horizontal $u_{2|BC}=0$ and $u_{2|AD}=u_{2|A}$.

In the 5P-RVE model the radius of the four large particles can be independently set to permit the study the effect of varying particle size distribution on the mechanical response. Six cases in particle geometry are simulated; in all cases, the ratio of the radius of large particle R1 to small particle RM was set to 2.4(R1/RM=2.40). The table below details the geometric configuration used in each simulation case in terms of the ratio of the radius of each large particle to that of the middle particle:

TABLE 1

| Case | 1 | 2 | 3 | 4 | 5 | 6 |
|---|---|---|---|---|---|---|
| R1/RM | 2.40 | 2.40 | 2.40 | 2.40 | 2.40 | 2.40 |
| R2/RM | 2.40 | 2.35 | 2.28 | 2.35 | 2.20 | 2.04 |
| R3/RM | 2.40 | 2.40 | 2.40 | 2.33 | 2.40 | 2.40 |
| R4/RM | 2.40 | 2.35 | 2.28 | 2.28 | 2.26 | 2.04 |

Because the oil-extended PP is similar to PP it is modelled using the constitutive model for the rate-dependent elastic-viscoplastic behavior of glassy polymers proposed in Boyce et al in an article titled Large Inelastic Deformation of Glassy Polymers: Part I: Rate-Dependent Constitutive Model, in Mech. Matls 7, 15–33 (1988) as later modified by Arruda and Boyce in Evolution of Plastic Anisotropy in Amorphous Polymer During Finite Straining, Intl. J. Plasticity, 9, 697–720 (1993).

The EPDM stress-strain behavior is modelled using the Arruda-Boyce constitutive model for rubber elasticity. Each RVE is subjected to an axial loading condition whereby the top edge is uniformly compressed in the 2-direction The total force on edge AD, the RVE height H and the RVE width W are monitored as a function of applied displacement. The RVE true stress vs. strain response is then computed exactly as done in the experiments.

Figure 4:
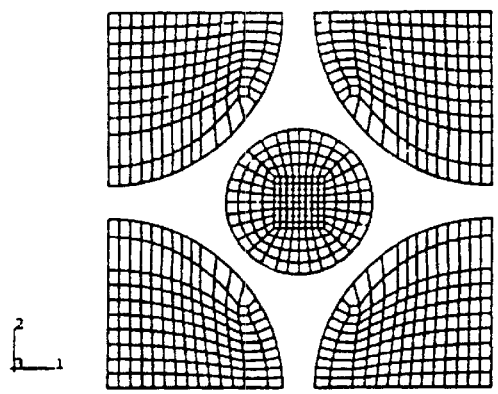
FIGS. 4A–4F are finite element meshes (showing particles only) for six micromechanical models.
Figure 4:
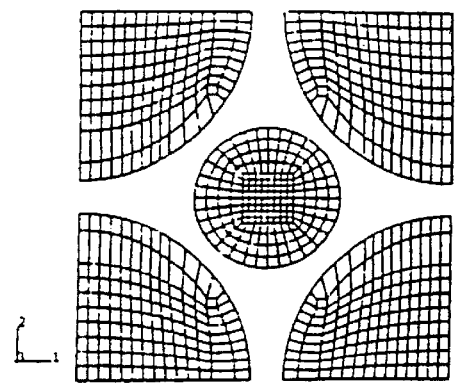
Figure 4:
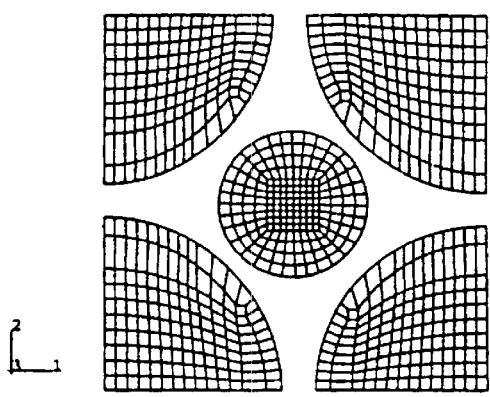
Figure 4:
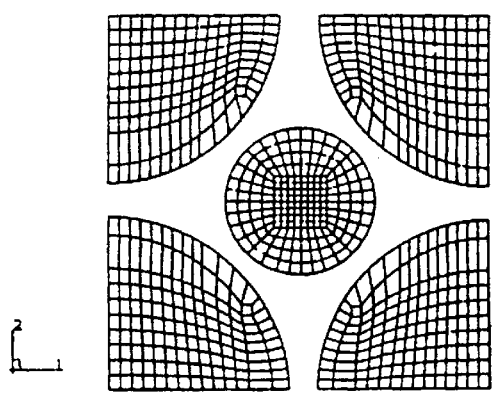
Figure 4:
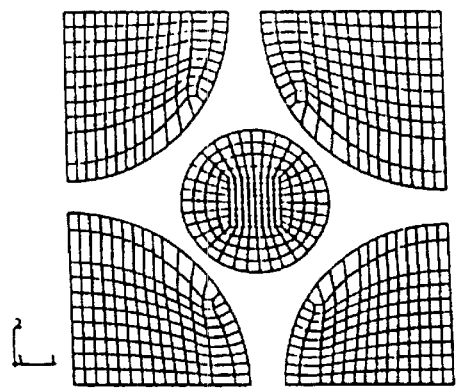
Figure 4:
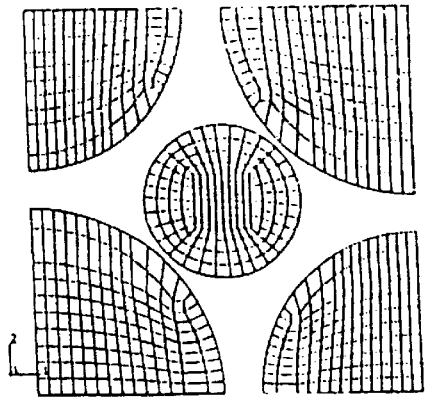

Six micromechanical models of TPV-R are subjected to plane strain compressive loading and unloading to true strains of −0.50 and −0.70. FIG. 4 shows the finite element mesh (depicting only the particles) for each of the six cases, the geometry of which is set forth in Table 1 above. Case 1 possesses perfect symmetry with respect to the relationship of each large particle radius to that of the middle particle. This sets up identical matrix ligament thicknesses between each large particle and RM. For Cases 2 and 3, the asymmetry of the mesh appears as a slightly smaller matrix ligament thickness bridging R1 and R3 with RM compared to the ligament thickness bridging R2 and R4 with RM. Case 4 possesses four different ligament lengths of similar dimensions to those in Cases 2 and 3. Case 5 possesses even smaller ligament thicknesses bridging R1 and R3 with RM than those of Cases 1, 2, 3 and 4. Finally, Case 6 is seen to possess extremely thin ligaments between two of the large particles and the middle particle. These six cases permit the study of the influence of ligament length and asymmetry on the overall mechanical behavior and deformation mechanisms.

The results for these simulations will be shown by first comparing the stress-strain behaviors produced by each RVE. Four cases are then selected (cases 1, 2, 5 and 6) and details regarding the deformation of the constituent phases are provided. The importance of geometry in controlling various aspects of the mechanical behavior is then discussed.

Figure 5:
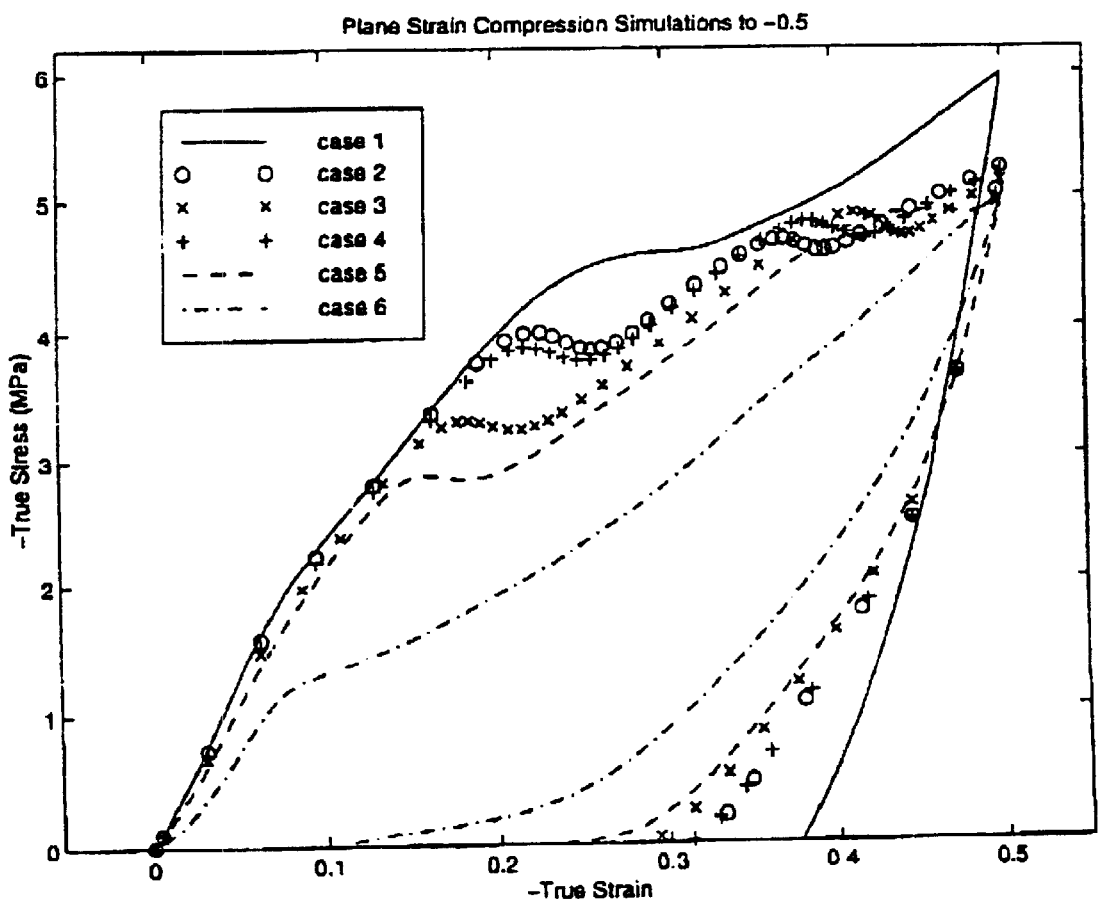
FIG. 5 shows curves predicting TPV-R plane strain stress-strain behavior during loading to a strain of −0.50 and unloading from that strain, based on the micromechanical model.
Figure 6:
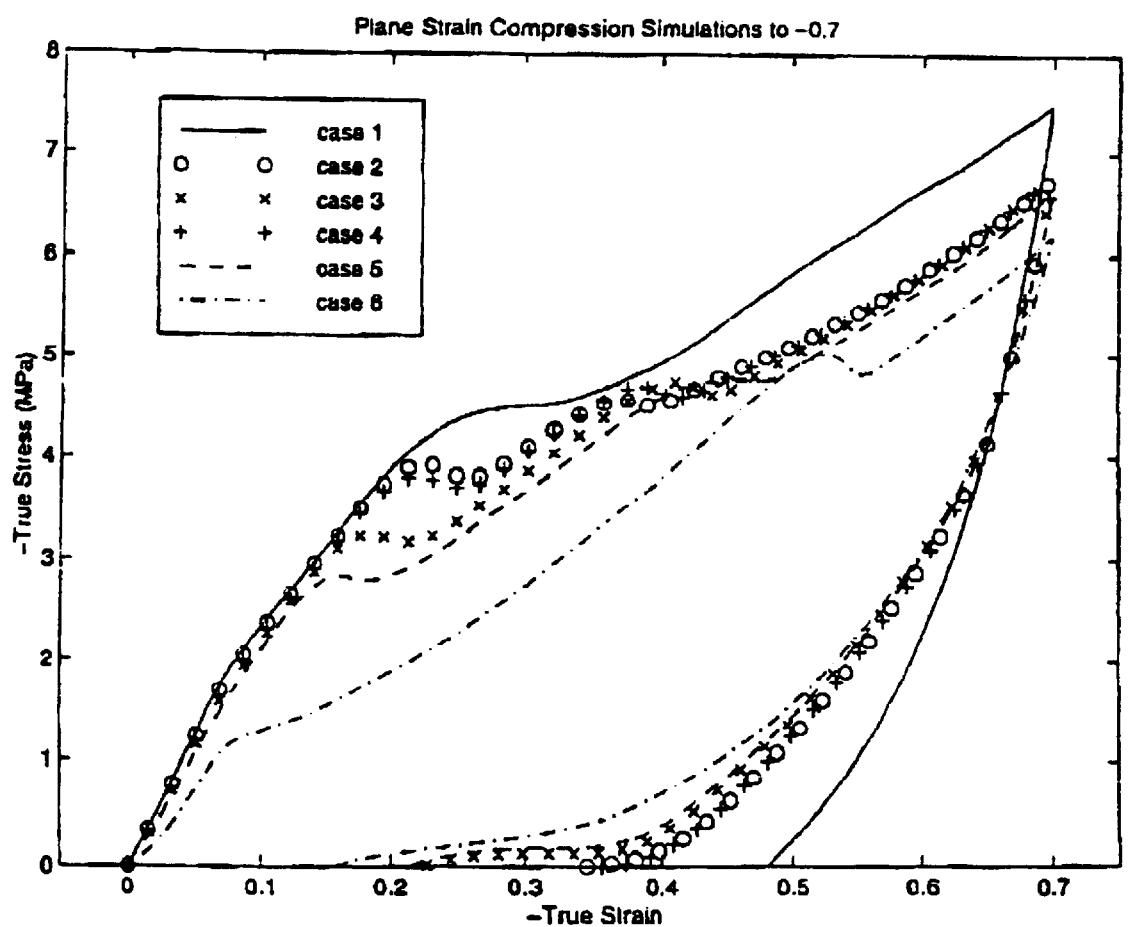
FIG. 6 shows curves predicting TPV-R plane strain stress-strain behavior during loading to a strain of −0.70 and unloading from that strain, based on the micromechanical model.
Figure 7:
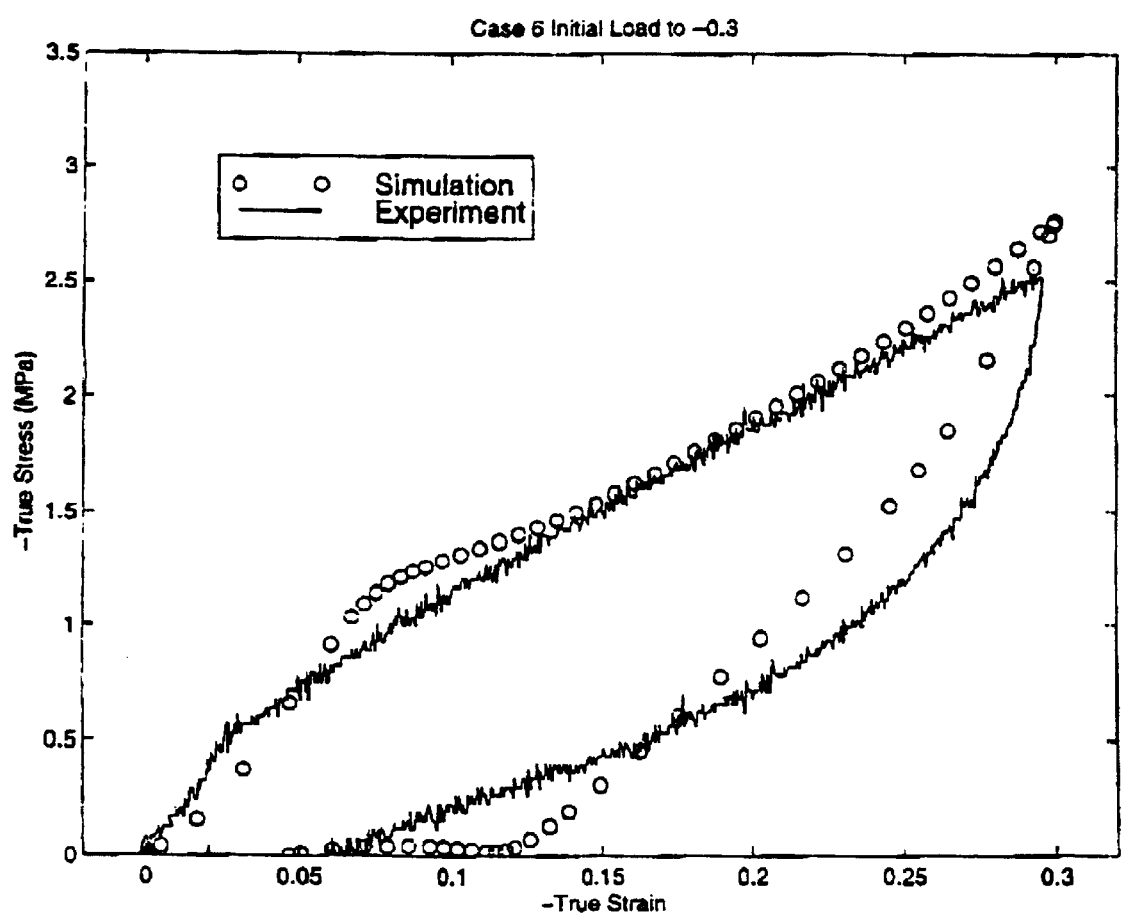
FIG. 7 shows curves for a RVE Case 6 model predictions of the plane strain stress-strain behavior compared to experimental results for loading to/unloading from a strain of −0.30.
Figure 8A:
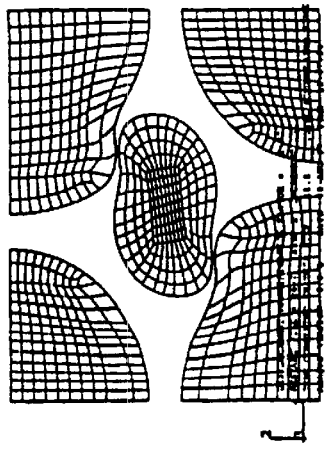
FIGS. 8A–8D are deformed meshes during loading and unloading (imposed strain of −0.70).
Figure 8B:
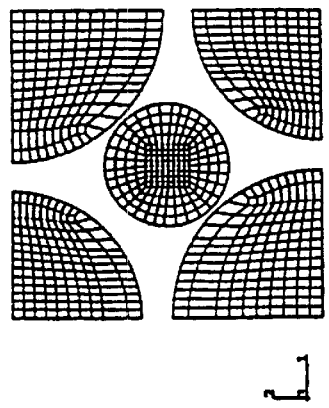
Figure 8C:
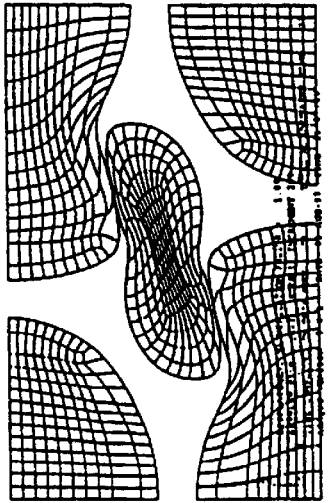
Figure 8D:
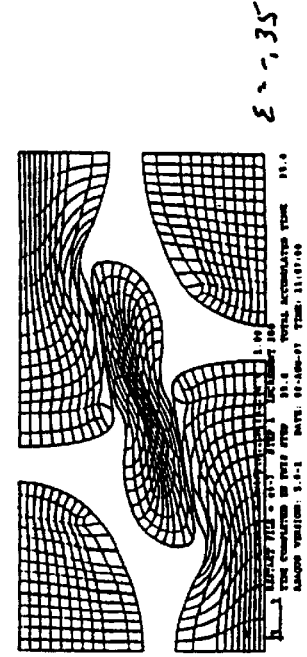

FIGS. 5 and 6 depict the true stress-true strain behavior to strains of −0.50 and −0.70 respectively, as computed by the six micromechanical models. As can be seen in the Figures, each model predicts a somewhat different stress-strain behavior. Each model predicts a relatively stiff initial response followed by a "flow stress" where the term "flow stress" refers to the stress level at which a dramatic roll-over or decrease in slope occurs in the stress-strain curve. The flow stress is then followed by strain stiffening/hardening (an increase in stress with continued straining). One can see that the initial stiffness is somewhat influenced by the geometry, where a smaller ligament length produces a more compliant initial response. The most dramatic effect of geometry is seen in the level of the flow stress. There is a dramatic decrease in flow stress with decreasing ligament thickness. The experimentally obtained behavior is found to lie closest to the Case 6 prediction. FIG. 7 depicts the Case 6 predictions together with the experimental data for loading and unloading to/from strains of −0.30 showing excellent agreement. This result indicates that it is the regions in the matrix material with the thinnest ligament that control the overall deformation and thus the stress-strain behavior of the material. Case 6 is also observed to most accurately predict the unloading (recovery) behavior of the material Elastic Recovery from Compression (plane strain) vs. Ligament Thickness Data may be plotted from anal of various structures with equal volume ratio of elastomer and thermoplastic matrix The mean particle diameter of the large particles is 1.0 $\mu$m. The data are given in Table 2 below.

TABLE 2*

| Ex. | Thinnest ligament ($\times 10^{-6}$ m) | % recovery from 25% compression | % recovery from 50% compression |
|---|---|---|---|
| 1 | 0.0597 | 25 | 20 |
| 2 | 0.0634 | 30 | 25 |
| 3 | 0.0458 | 32.8 | 30 |
| 4 | 0.0507 | 40 | 35 |
| 5 | 0.0403 | 70 | 60 |
| 6 | 0.0179 | 80 | 70 |
| Actual TPV | <0.02 | 83 | 74 |

*the foregoing data in italics are constructively presented and rounded off as there was an apparent error in the programming parameters.

The foregoing examples have varying symmetry and other geometrical differences that also act on the elastic recovery in addition to the effect of the thinnest ligament. For example the Ex. 1 has a tightly constrained boundary condition that forces all of the plastic ligaments to yield simultaneously and has a more severe effect than its ligament thickness alone would indicate. Thus some of the numbers would appear to be higher or lower than one would expect from familiarity with actual material having the modulus of these theoretical materials.

It is evident from the above data that the effect of the thin ligaments is demonstrated when it is less than about 0.0507 $\mu$m, or about 5% of the mean large particle diameter. The higher the % compression, the greater the improvement in elastic recovery. Depending upon the compositions of the rubber and plastic phases, the number and diameters of large and small particles, and the volume fraction of rubber, it is evident that, for the specific rubber modelled, though there is improvement in elastic recovery with thin ligaments less than 0.1 $\mu$m thick, the highest improvement results with ligaments less than 0.05 $\mu$m.

The following illustrative examples demonstrate a dynamic representation of compression and recovery using a modified finite element analysis presented at the Gordon Research Conference on Elastomers Jul. 19, 1999 at Colby-Sawyer College, New London, New Hampshire by Mary Boyce.

The model used herein is a 5 particle RVE that uses the Abaqus finite element analysis software. The rubber material is modeled using the Arruda Boyce 8 chain model for rubber. The plastic matrix is modeled using the elastic plastic theory mentioned earlier. Data for the rubber phase and plastic are measured separately using a Monsanto T-10 tensometer and an Instron tensometer with controlled strain rate and fit to these theories. The rubber was mixed in a Brabender internal mixer adding the curative components on a rubber mill to keep the temperature below the vulcanization temperature. Samples were press-cured to the maximum cure point based on a rheometer cure curve. The rubber to plastic volume ratio is selected based on a typical commercially significant elastomeric material.

The following Table 3 sets forth data for theoretically formulated TPVs for which the "% recovery" values in italics are constructively presented and rounded off. The ratio of rubber: plastic is 77:23 and in each case the rubber is given a modulus of 025 MPa This ratio is commercially significant and used in a soft rubbery material which is used in a wide variety of applications. The values generated for the TPVs compare a theoretical thermoplastic with varying stiffness, formulated with rubber properties maintained constant, on the assumption that the same rubber would be used in each recipe. The plastic stiffness in the range from 100 MPa to 2500 MPa covers the range for most commercially useful thermoplastics. The three values selected are based on the low, high and middle of the range. Only three of the several examples discussed previously are presented to span the ligament thickness range.

TABLE 3

| Ex. | Thinnest Ligament (× 10⁻⁶ m) | Low Modulus TPV: 100 MPa (% recovery) | Medium Modulus TPV: 500 MPa (% recovery) | High Modulus TPV: 2500 MPa (% recovery) |
|---|---|---|---|---|
| 1 | 0.0597 | 35 | 25 | 15 |
| 3 | 0.0458 | 65 | 32.8 | 30 |
| 6 | 0.0179 | 95 | 80 | 60 |

The data in Table 3 demonstrate that the thinnest ligament exhibited the highest elastic recovery irrespective of the stiffness of the plastic phase.

The following Table 4 sets forth the types of plastics used in recipes for TPVs formulated to provide comparisons with actual rubber and plastic TPV compositions. The thermoplastic selected for tests are commercially interesting materials used to formulate TPVs which it is hoped will have optimum elastic recovery.

TABLE 4

| Thermoplastic Tested | Grade |
|---|---|
| Polyethylene (PE) | 50:50 Escorene LL6101/ Escorene LL1001 |
| Nylon 6 (PA6) | Capron 8202 |
| Polybutylene terephthalate (PBT) | Valox 315 |

The following Table 5 presents recipes for rubber compounds used in various samples. The natural rubber (NR) used was SMR CV60, the nitrile rubber (NBR) was Nipol 1022 and the ethylene acrylate rubber (AEM) was Vamac GLS.

TABLE 5

| Ingredient | NR | NBR | AEM |
|---|---|---|---|
| SMR CV-60 | 100 | | |
| Nipol 1022 | | 100 | |
| Vamac GLS | | | 100 |
| SP-1045 resin[1] | 5 | 5 | |
| SnCl$_2$.2H$_2$O | 1 | 1 | |
| DOTG[2] | | | 4 |
| DIAK[3] No. 1 | | | 1 |

[1]SP-1045 resin is an alkyl pheol-formaldehyde resin
[2]di-orthotolyl guanidine
[3]DIAK is hexamethylenediamine carbamate The following specific TPV compositions are prepared, each having a rubber:plastic ratio of 77:23 by volume: EPDM/PP; NR/PE; NBR/PA6; and AEM/PBT. Other additives that might be added in commercially useful compositions, additives such as, oils, plasticizers, stabilizers, fillers, reinforcements, etc. are purposely not included in the recipe to avoid complicating the problem of arriving at easily comprehensible results for these demonstration purposes.

The following Table 6 sets forth the values for % recovery calculated for the four TPV compositions specified above. The value in italics is are constructively arrived at and rounded off while some questionable computer results were resolved to complete the demonstration with these various rubber/plastic pairs used for TPV composition.

TABLE 6

| | | Calculated values for % recovery | | | |
|---|---|---|---|---|---|
| Ex. | Thinnest Ligament (× 10⁻⁶ m) | EPDM/ PP | NR/ PE | NBR/ PA6 | AEM/ PBT |
| 1 | 0.0597 | 25 | 30.9 | 22 | 24.7 |
| 3 | 0.0458 | 32.8 | 40.2 | 31.7 | 34 |
| 6 | 0.0179 | 85 | 95 | 90 | 80 |
| Real | <0.02 | 83.0 | 94.1 | 88.6* | 81.2* |

*these measured values for real samples were prepared in a conventional manner as were the others, but appear to be substantially higher than calculated indicating that the plastic phase was degraded.

Olefinic plastics are preferred, including polymers and copolymers of lower olefins having from 1 to 4 carbon atoms, one or more of which monomer may have a functional group, typically halogen, hydroxyl, carboxyl and copolymers of alpha unsaturated diolefins. If desired, a thermoplastic a non-polyolefinic plastic may be used, for example, one selected from the group consisting of polyamides, polycarbonates, polyesters, polysulfones, polylactones, polyacetals, acrylonitrile-butadiene-styrene (ABS), polyphenylene oxide (PPO), polyphenylene sulfide (PPS), styrene-acrylonitrile (SAN), polyimides, styrene-maleic anhydride (SMA) and aromatic polyketones, any of which may be used by itself or in combination with another. Most preferred engineering thermoplastic resins are polyamides and polyesters. Commercially available polyamides having a Tg or melting temperature (Tm) above 100° C. may be used but those having a Tm in the range from 160° C. to about 280° C. are preferred. Preferred polyamides are nylon 6, nylon 11, nylon 12, nylon 6,6, nylon 6,9, nylon 6,10, and nylon 6/6,6. Most preferred are nylon 6, nylon 6,6, nylon 11, nylon 12 and mixtures or copolymers thereof. Additional examples of suitable polyamides described in the *Encyclopedia of Polymer Science and Technology*, by Kirk & Othmer, Second Edition, Vol. 11, pages 315–476, are incorporated by reference thereto as if fully set forth herein. The polyamides generally have a number average molecular weight of from about 10,000 to about 50,000, and desirably from about 30,000 to about 40,0000.

Suitable thermoplastic polyesters include the various ester polymers such as polyester, copolyester, or polycarbonate, polybutylene terephthalate (PBT), etc., a monofunctional epoxy endcapped derivative thereof, and mixtures thereof. The various polyesters can be either aromatic or aliphatic or combinations thereof and are generally directly or indirectly derived from the reactions of diols such as glycols having a total of from 2 to 6 carbon atoms and desirably from about 2 to about 4 carbon atoms with aliphatic acids having a total of from 2 to 20 carbon atoms and desirably from about 3 to about 15 or aromatic acids having a total of from about 8 to about 15 carbon atoms. Generally, aromatic polyesters are preferred such as polyethyleneterephthalate, polybutyleneterephthalate, polyethyleneisophthalate, polynaphthaleneterephthalate, and the like, as well as end-capped epoxy derivative thereof e.g., a monofunctional epoxy polybutyleneterephthalate. Various polycarbonates can also be utilized and the same are esters of carbonic acid. A suitable polycarbonate is that based on bisphenol A, i.e. poly(carbonyldioxy-4-phenyleneisopropylidene-1, 4pheneylene).

The various ester polymers also include block polyesters such as those containing at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester is polybutyleneterephthalate-b-polyethylene glycol which is available as Hytrel from DuPont.

In addition to EPDM, or in lieu thereof other curable rubbers include halogenated olefinic, acrylate and nitrile rubbers, and silicone. Rubbers useful in the blends include butyl rubber, halobutyl rubber, and EPR (ethylene/propylene rubber), arylonitrile/butadiene rubber (NBR) and natural rubber. Combinations of two or more rubbers of different types can also be used. Thermoplastic elastomers which can be successfully foamed by the process of the invention are described in the following U.S. patents, the disclosures of which are herein incorporated by reference: U.S. Pat. Nos. 4,104,210; 4,130,534; 4,130,535; 4,299,931; and 4,311,628; inter alia. Also useful are blends of crystalline polyolefin plastics and, partially cured rubbers, such as those described in U.S. Pat. Nos. 3,806,558 and 3,862,056 and blends of crystalline polyolefins and uncured EPR or EPDM rubber.

Copolymers of two or more of the following monomers may be used, provided at least one monomer has a functional group curable in a condensation reaction: an alkyl acrylate, a lower olefin, and an acrylate with a functional group.

In an alkyl acrylate, alkyl typically has 1 to 3 carbon atoms and includes a repeating unit with a functional group and another repeating unit chosen from ethyl acrylate, butyl acrylate, ethylhexyl acrylate, and the like. An olefinic repeating unit is chosen from an olefin having from 2 to 4 carbon atoms, and the molar ratio of such olefin units to acrylate repeating units is typically in the range from 0.5 to 1.5. A preferred functional group on an acrylic rubber is halogen, carboxyl, epoxy, or hydroxy. Suitable acrylate rubbers are commercially available.

The curing of a rubber in each stage is effected in the presence of an effective amount of one or more curing agents present in an amount sufficient to result in a substantially complete cure of that rubber, namely at least 90 percent, though a lesser degree of cure, as low as about 80 percent may be acceptable. Curing agents for a particular rubber are usually specified by the maker of the rubber.

Having thus provided a general discussion, described the essential requirement for making a TPV with optimum or near optimum elastic recovery, and having confirmed the requirement with a micromechanical model it is now possible to use that model to predict whether the essential requirement can be met in a TPV having any composition. It will be evident that the invention has provided an effective solution to a difficult problem. It is therefore to be understood that no undue restrictions are to be imposed by reason of the specific embodiments illustrated and discussed, and particularly that the invention is not restricted to a slavish adherence to the details set forth herein.

We claim:

1. A thermoplastic vulcanizate of an elastomer and a plastic comprising particles of elastomer dispersed in a continuous phase of plastic such that large particles which are present in a major proportion by volume relative to small particles, are adjacent at least one small particle spaced apart by ligaments, and at least 15% of the ligaments have a thickness less than 10% of the mean diameter of large particles, the remaining ligaments having a thickness less than 50% of the large particles' mean diameter, wherein the mean large particle diameter is in the range from 1 $\mu$m to 3 $\mu$m, and the small particle diameter is in the range from about 1% to 60% of the mean large particle diameter.

2. The TPV of claim 1 wherein said ligaments have a thickness less than 5% of the mean large particle diameter, and said remaining ligaments having a thickness from 15% to about 30% of said mean large particle diameter, and the small particle diameter is in the range from 10% to 40% of the mean large particle diameter.

3. The TPV of claim 1 wherein said mean large particle diameter is about 1 $\mu$m.

4. The TPV of claim 1 wherein said plastic is selected from the group consisting of a polyolefin, polyamide, polycarbonate, polyester, polysulfone, polylactone, polyacetal, acrylonitrile-butadiene-styrene (ABS), polyphenylene oxide (PPO), polyphenylene sulfide (PPS), styrene-acrylonitrile (SAN), polyimide, styrene-maleic anhydride (SMA) and aromatic polyketone, any of which may be used by itself or in combination with another.

5. The TPV of claim 1 wherein said rubber is selected from the group consisting of EPDM rubber, halogenated olefinic rubber, EPR (ethylene/propylene rubber), acrylonitrile/butadiene rubber (NBR), natural rubber, silicone, and a copolymer of an alkyl acrylate, a lower olefin, and an acrylate with a functional group.

6. In a process for melt-blending ingredients of a thermoplastic vulcanizate ("TPV") to produce a matrix of plastic in which large rubber particles having a mean particle diameter in the range from 1 $\mu$m to 3 $\mu$m, and small particles having a mean diameter in the range from 1% to 60% of the mean large particle diameter, are randomly dispersed, the improvement comprising, provided appropriate processing conditions for sufficient time, including enough energy introduced at a rate sufficient to produce a matrix of plastic in which substantially all said small particle is adjacently disposed relative to at least 3 large particles, the small particle and the large particles being in near-contiguous relationship such that the small particle is spaced apart from at least one large particle by at least two ligaments having a thickness less than 5% of the mean diameter of large particles in the matrix, and the remaining ligaments are in the range from more than 10% to about 50% of the mean large particle diameter, whereby said TPV has substantially optimum elastic recovery.

* * * * *